United States Patent

Griepentrog

[15] 3,674,932

[45] July 4, 1972

[54] AUTOMATIC BEAM CURRENT LIMITER

[72] Inventor: Dal Frank Griepentrog, Indianapolis, Ind.

[73] Assignee: RCA Corporation

[22] Filed: Feb. 16, 1971

[21] Appl. No.: 115,473

[52] U.S. Cl. ....................................... 178/7.5 R, 178/7.5 DC

[51] Int. Cl. ....................................... H04n 5/19, H04n 5/58

[58] Field of Search ............178/5.4 R, 7.3 R, 7.5 R, 7.3 DC, 178/7.5 DC, DIG. 11

[56] References Cited

UNITED STATES PATENTS

| | | | |
|---|---|---|---|
| 3,465,095 | 9/1969 | Hansen et al. | 178/5.4 R |
| 3,541,240 | 11/1970 | Curtis | 178/5.4 R |
| 3,564,137 | 2/1971 | MacIntyre et al. | 178/5.4 R |
| 3,578,903 | 5/1971 | Willis | 178/5.4 R |

*Primary Examiner*—Robert L. Richardson
*Attorney*—Eugene M. Whitacre

[57] ABSTRACT

A normally saturated transistor having its collector electrode serially coupled with the brightness control for a television kinescope, its emitter electrode grounded, and its base electrode coupled to sense the amount of current flowing through such device is effective to dynamically adjust the direct current bias of the video signal chain when that current exceeds a predetermined value, with the change in bias being in an offsetting direction to reduce the kinescope drive. Such an arrangement proves advantageous in eliminating the need for a brightness limiter control potentiometer—of the type utilized in U.S. Pat. No. 3,541,240, for example—which, though normally pre-set prior to delivery of the receiver to a purchasing customer, could become misadjusted and result in damage to the television picture tube.

11 Claims, 3 Drawing Figures

INVENTOR.
DAL F. GRIEPENTROG
BY
[signature]
ATTORNEY

AUTOMATIC BEAM CURRENT LIMITER

BACKGROUND OF THE INVENTION

1. Field of the Invention

This invention relates to television receivers, in general, and to an improvement of the automatic beam current limiting circuit disclosed in U.S. Pat. No. 3,541,240, in particular.

2. Description of the Prior Art

Such prior art circuit—as employed in the CTC 40 color television receiver described in the publication of the RCA Sales Corporation under the designation File 1969, No. T17—is employed to maintain picture tube beam current within proper limits. The drive capacity of the horizontal deflection system used in that receiver was such that with high, non-limited brightness control settings, it was possible to exceed the current capabilities of its picture tube. The brightness limiting action provided by the circuit of U.S. Pat. No. 3,541,240, however, operated to reduce the forward bias voltage on the second video amplifier of the receiver once a pre-set limit of picture tube beam current was reached, to prevent "blooming" or defocusing of the kinescope at those high brightness settings.

As described in such patent, the brightness limiting action followed the use of a brightness limiter control potentiometer which was initially pre-set so that with the picture tube cut off, the limit of desired picture tube beam current flowed through it and through the collector-emitter path of a transistor in conjunction with which the potentiometer operated. When the brightness control of the receiver was thereafter advanced so that the picture tube drew beam current, part of the current which previously flowed only through the limiter control potentiometer then passed through the picture tube, and only the remainder flowed through the limiter transistor. When the brightness control was advanced to the point where the picture tube drew the desired limit for its operation, all of the current initially flowing through the limiter control potentiometer then flowed as beam current, and depleted the transistor of the current necessary to sustain its conduction. Its described regulating action was therefore terminated, such that further demand of current by the picture tube caused a switching action whereby the direct current bias of the video chain was rapidly decreased. This change in bias was in the direction to reduce the picture tube beam current to the desired limit and to stabilize the picture tube brightness.

SUMMARY OF THE INVENTION

The automatic beam current limiter of the present invention, on the other hand, will be seen to represent an improvement of that described in U.S. Pat. No. 3,541,240 in its elimination of the separate brightness limiter control potentiometer. Concomitant with its elimination is the corresponding elimination of any cable arrangements employed in connecting the potentiometer from its chassis location—where the initial pre-set adjustment is controlled—to the circuitry of the receiver with which it is associated. Such features first of all, represent a savings in the overall cost of the limiter arrangement (which is not substantially offset by the cost of any additional components utilized in the instant circuit configuration), and second of all, removes the possibility of damage to the picture tube resulting from misadjustment of the limiter control.

As will be seen hereinafter, the automatic beam current limiter of the present invention utilizes a normally saturated transistor having its collector electrode serially coupled with the brightness control employed for the video signal chain of the television receiver. The base electrode circuit of the transistor, on the other hand, is arranged to sense the picture tube beam current—for example, by connection to a high voltage power supply of the type described in the pending U.S. Pat. application, Ser. No. 830,026, filed June 3, 1969, now abandoned and assigned to the same assignee as is the invention of this case. With the emitter electrode of the transistor grounded, and with increasing amounts of beam current being drawn, the current flowing in the base electrode circuit of the transistor from a substantially constant voltage source decreases. Any attempt for the beam current to exceed the maximum base current flow from this source is offset by the construction bringing the transistor out of saturation, and in a direction such that the resulting voltage change at its collector electrode dynamically decreases the brightness control bias coupled to the video signal chain.

Another important advantage of the arrangement to be described resides in its use of a pair of resistors of differing power handling capabilities as a means of filtering the vertical and horizontal rate modulation which may be present on the picture tube beam current and as a means of protecting the described arrangement if the voltage supply output were to momentarily short-circuit. The lower wattage resistor will be seen to open circuit, and protect the limiter of the invention before any significant damage can be done.

BRIEF DESCRIPTION OF THE DRAWINGS

These and other advantages of the invention will become clear from a consideration of the following description taken in connection with the accompanying drawings in which.

DETAILED DESCRIPTION OF THE DRAWINGS

Figure 1:
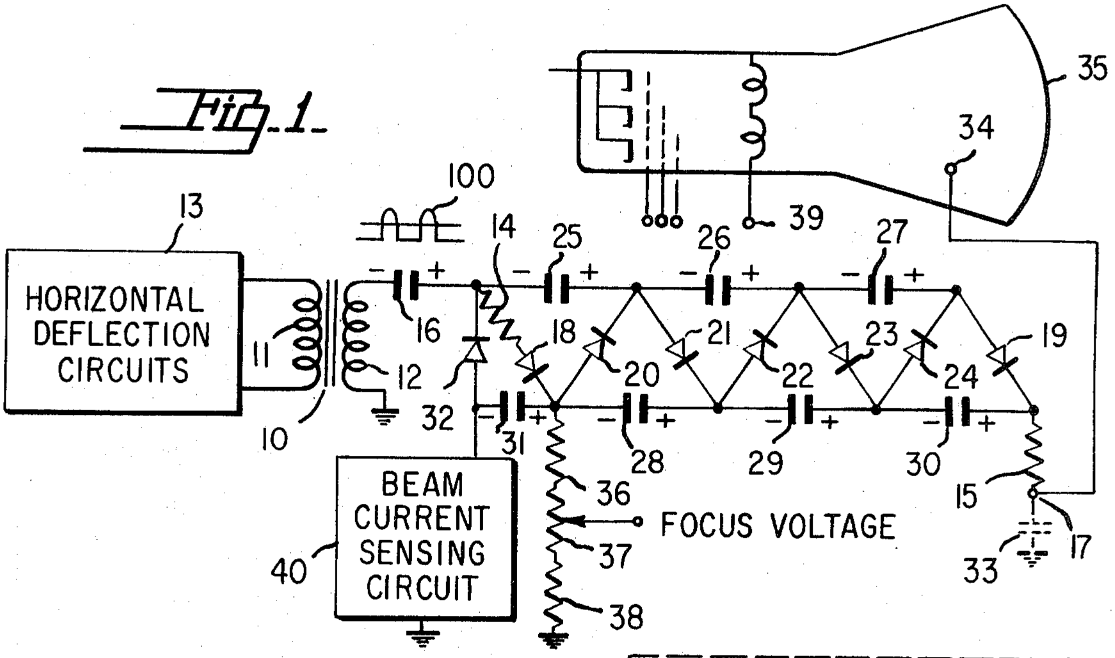
FIG. 1 illustrates a voltage supply of the type described in application, Ser. No. 830,026, in conjunction with which the automatic beam current limiter of the present invention is particularly attractive.

The power supply shown in FIG. 1 generally includes a horizontal output transformer having a high voltage winding, along with voltage multiplying stages for producing the ultor voltage for the television kinescope. A lower voltage output arrangement is also associated with the voltage multiplying means to respond to the kinescope beam current to produce a focus voltage which tracks with the ultor voltage.

More particularly, the horizontal output transformer 10 is shown as having a primary winding 11, a secondary winding 12 and a turns ration sufficient to stepup the voltage of the flyback pulse generated by the horizontal deflection circuitry of the receiver 13. For the ultor voltage $V_1$ of approximately 25 kilovolts required by a color television kinescope—and with the four stages of voltage multiplication shown—, the magnitude of the flyback pulse 100 developed by secondary winding 12 will generally be of the order of 6.25 kilovolts.

As indicated, the voltage supply of FIG. 1 includes eight rectifier devices together with an equal number of charge storage capacitors. A pair of resistors 14, 15 and a first of these capacitors 16 respectively couple seven of the eight rectifier devices between the high voltage terminal of winding 12 and the ultor output terminal 17 in such manner that the anode electrode of the first of these seven rectifiers 18 is coupled to resistor 14, the cathode electrode of the last of these seven rectifiers 19 is coupled to resistor 15 and the cathode electrode of each of the remaining five rectifiers 20–24 is serially coupled in the chain to the anode electrode of the next rectifier. As is also shown, six of the seven capacitors are coupled between opposing electrodes of the adjacent seven rectifiers of this chain—namely, capacitor 25 being coupled by resistor 14 between the anode electrode of rectifier 18 and the cathode electrode of rectifier 20, capacitor 26 being connected between the anode electrode of rectifier 21 and the cathode electrode of rectifier 22, and with capacitor 27 being connected between the anode electrode of rectifier 23 and the cathode electrode of rectifier 24. Similarly, capacitor 28 is connected between the anode electrode of rectifier 20 and the cathode electrode of rectifier 21, while capacitor 29 is connected between the anode electrode of rectifier 22 and the cathode electrode of rectifier 23, and capacitor 30 is connected between the anode electrode of rectifier 24 and the cathode electrode of rectifier 19. The remaining eighth capacitor 31 is coupled between the cathode electrode of rectifier 18 and the anode electrode of the eighth rectifier 32, which has its cathode electrode returned to the junction of resistor 14 with capacitor 16.

The charge capacitor 33 illustrated in dotted lines between ultor terminal 17 and ground represents the capacitance of the aquadag coating 34 on the receiver kinescope 35. Resistor 14 is included to prevent capacitor 31 from fully charging during the positive portion of the flyback pulses 100, and also provides the proper voltage relationship between the ultor voltage $V_1$ and a developed focus voltage $V_2$. The resistor 15 is included to protect the horizontal output circuitry 13 in the event of kinescope arcing.

A voltage divider arrangement comprising three resistors 36–38 is serially coupled between the cathode electrode of rectifier 18 and ground to develop the focus voltage. Such voltage is obtained by means of a variable slider on resistor 37 and is applied to the focus electrode 39 of kinescope 35. Lastly, a beam current sensing circuit 40 is shown coupled between the junction of capacitor 31 with rectifier 32 and ground, and is operative in providing the brightness limiting functions to be discussed below.

As described in the Ser. No. 830,026 application—the disclosure of which is herein incorporated by reference—, the ultor voltage developed at terminal 17 is substantially equal to the sum of the voltages developed across the serially coupled capacitors 28–31 plus the voltage developed across the sensing circuit 40. Such arrangement develops an output voltage almost four times the peak-to-peak value of the flyback pulse waveform 100.

Figures 2, 3:
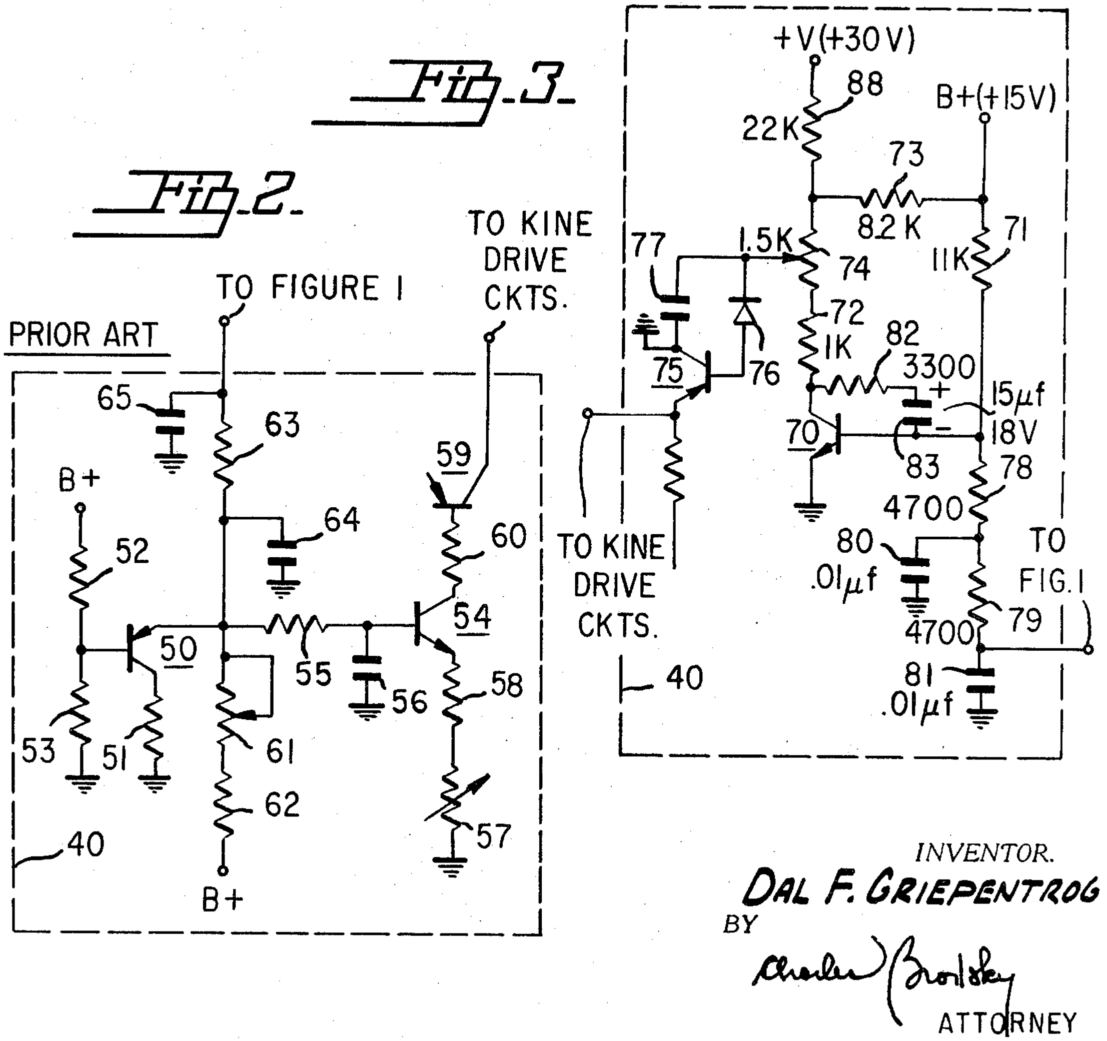
FIG. 2 illustrates a means of connecting the brightness limiter of U.S. Pat. No. 3,541,240 with the high voltage supply of FIG. 1.
FIG. 3 illustrates one embodiment of the present invention as it might be used with the supply of FIG. 1.

FIG. 2 illustrates the automatic beam current limiting circuit of U.S. Pat. No. 3,541,240, as it might be utilized with the voltage supply of FIG. 1, particularly as the current sensing circuit 40. As shown, the FIG. 2 arrangement employs a transistor 50 having a collector electrode coupled to a point of reference potential by a resistor 51 which acts to limit the maximum current through the device 50 in the event of power supply arcing. A pair of resistors 52, 53 are serially coupled between a source of regulated B+ potential and ground, with their junction being direct current coupled to the base electrode of transistor 50 so as to fix the transistor bias at a point where the voltage drop across it is relatively independent of the current flowing through it so long as the transistor is conductive. The emitter electrode of transistor 50 is coupled to the base electrode of a video amplifier transistor 54 by a resistor 55 which forms a filter circuit along with an included capacitor 56 to smooth any existent horizontal ripple from the beam current limiter and to suppress any spikes which might result from high voltage arcing. A brightness control 57 is serially coupled between ground and the emitter electrode of transistor 54 by a resistor 58. With the collector electrode of transistor 54 being coupled to the base electrode of a further video amplifier transistor 59 by a resistor 60 and with further direct coupling from transistor 59 to the video drive circuits for the kinescope in correct polarity, adjustment of the potentiometer 57 serves to vary the picture tube beam current.

In accordance with the invention of 3,541,240 patent, a brightness limiter control potentiometer 61 is serially coupled between the emitter electrode of transistor 50 and the B+ source by a resistor 62. Such potentiometer is coupled to the junction of capacitor 31 and rectifier 32 of FIG. 1—for example, by means of a filter network including resistor 63 and capacitors 64, 65 which removes a major portion of the horizontal ripple and most of the high voltage spikes, to which resistor 55 and capacitor 56 provide additional control. By adjusting the brightness control 57 to cut-off the picture tube and then adjusting the brightness limiter potentiometer 61 so that the current through transistor 50 is set at the desired picture tube beam current limit, the arrangement as described in such patent operates to maintain the picture tube beam current at this limit by reducing the forward base bias voltage on the video amplifier transistor 54 when such pre-set limit of picture tube beam current is reached. At this level, just enough current flows in transistor 50 to sustain its conduction and hold its regulating action, but beyond which, further increase in picture tube beam current switches transistor 50 out of conduction to decrease the direct voltage at its emitter electrode and the forward bias on transistor 54. Such action rapidly decreases the average conduction of transistor 54 and, because of the compensating direct current coupling to the kinescope, reduces the picture tube beam current to the desired limit.

The arrangement of FIG. 3 is similar to that of FIG. 2 in that the illustrated beam current limiter may serve as the sensing circuit coupled to the junction of capacitor 31 with rectifier 32 of FIG. 1. It differs from the FIG. 2 arrangement, however, in that the previously employed brightness limiter potentiometer 61 and its associated resistor 62 are eliminated. The maximum value of beam current which can flow using this construction is limited by the brightness limiting transistor connections themselves, without the need for any such additional control which—although pre-set during receiver manufacture and test—could become misadjusted and result not only in "-blooming" or defocusing at high brightness settings, but could actually result in damage to the kinescope. Not only does the elimination of this potentiometer result in a savings of its relatively expensive cost compared to that of fixed resistors, but its elimination also effects a savings in the cost of cabling needed to connect it from its chassis location (at which its adjustment is made) to the point in the receiver where the regulating transistor is located.

As shown in FIG. 3, the automatic beam current limiter of the invention includes a transistor 70 having an emitter electrode directly connected to a point of reference or ground potential and a base electrode coupled to a source of regulated B+ voltage via a resistor 71. The collector electrode of transistor 70 is also coupled to the B+ source, by means of a series connection including resistors 72 and 73 which respectively couple to opposite terminals of the included brightness control potentiometer 74. The variable arm of the control 74 is coupled, as shown, to the base electrode of a second video amplifier transistor 75 through a DC restorer circuit including a semiconductor rectifier 76 having its anode electrode directly connected to the base electrode of transistor 75 and its cathode electrode coupled by a capacitor 77 to the collector electrode of that transistor. The emitter electrode of transistor 75 is, in turn, coupled to the video drive circuits for the red, green, and blue electron guns of the cathode-ray kinescope in appropriate manner. As shown, the collector electrode of transistor 70 is additionally coupled to a source of operating potential +V via a resistor 88 connected at its other end to the junction of resistor 73 with potentiometer 74.

A pair of resistors 78, 79 serially couple the base electrode of transistor 70 to the junction of capacitor 31 with rectifier 32 of FIG. 1, with the junction of these two resistors being coupled to ground by a first capacitor 80 and with the junction of capacitor 31 and rectifier 32 being further coupled to ground by a second capacitor 81. Capacitor 81 cooperates with the effective impedance at the junction of capacitor 31 with rectifier 32 to form an R-C filter which reduces the horizontal rate modulation existent on the beam current representative flow, while the combination of resistors 78 and 79 together with capacitor 80 forms a second filter to further reduce the horizontal rate modulation as well as any vertical rate modulation which might be existent on the beam current flow. Since 180° of phase shift may be introduced by such filter networks—and because such phase shift can cause oscillation to limit beam current flow—the configuration of FIG. 3 further includes a resistor 82 and a capacitor 83 serially coupled between the collector and base electrodes of transistor 70, to cancel the effects of such phase shift by lowering the AC gain of the circuit.

Resistor 79 is selected of lower power rating than resistor 78, to protect the arrangement should the high voltage supply short circuit in a manner to produce a large negative kilovolt potential at the junction of capacitor 31 with rectifier 32. Resistor 79 will thus burn up, and open circuit prior to similar destruction of resistor 78 and the remainder of the circuit configuration. Resistors 72 and 73 are included to limit the brightness control range otherwise possible as extending from substantially zero volts (when transistor 70 is in saturation) to the value of the B+ source (when transistor 70 is cut-off).

In operation, the resistor 71 coupling the base electrode of transistor 70 to the regulated supply source normally maintains that transistor in saturation for the typical values of collector resistors illustrated. With the emitter electrode of transistor 70 grounded as shown, the current flowing into the base electrode of transistor 70 will be substantially equal to the difference between the value of the B+ source and the base-to-emitter offset voltage of the transistor, divided by the resistance value of resistor 71. This is the value of base current which flows, for example, when the brightness control 74 is adjusted to just cut-off the picture tube beam current. The current flowing through resistors 78, 79 to the junction of capacitor 31 with rectifier 32, in this instance, is thus substantially zero. As the brightness control 74 is advanced to initiate beam current flow, the amount of current flowing to such capacitor-rectifier junction increases at the expense of the base current flow to transistor 70, although the total current through resistor 71 remains substantially unchanged. As the brightness control 74 is continually advanced to increase picture tube beam current, less and less base current flows through transistor 70 until a point is reached at which that transistor is brought out of saturation. Such point depends upon the forward current gain characteristic of transistor 70, and typically may be reached when the current flow to the base electrode is of the order of 0.1 milliamperes for the values shown, where the current flowing through resistor 71 is of the order of 1.3 milliamperes. The 1.2 milliamperes of current flowing through resistors 78, 79 at this time represents the beam current limit since further adjustment of the brightness control 74 decreases the base current flow of transistor 70 all the more, to turn that transistor "off" and in a direction which increases its collector electrode voltage and decreases the effective voltage at the variable arm of the brightness control. The picture tube beam current is thus automatically limited to this 1.2 milliampere value or so, as further attempts at its increase dynamically decreases the brightness control bias applied to the video amplifier transistor 75.

A circuit embodying the principles of the arrangement described in FIG. 3 has been constructed and is presently incorporated in the CTC 49 color television receiver illustrated in the publication of the RCA Sales Corporation under the designation File 1970, No. T19.

While there has been described what is considered to be a preferred embodiment of the present invention, it will be readily apparent that modifications may be made without departing from the teachings herein. It is therefore contemplated that the present invention be read only in light of the appended claims which define the structure leadinG to the advantages described herein. Such advantages will be seen to exist not only when the brightness control of the receiver is advanced beyond the desired limits of picture tube beam current, but also when an adverse loading of the high voltage supply driving the kinescope is developed. As will be apparent, this loading can also yield an unacceptable video display in that excessively high beam currents can lead to X-ray radiation by the kinescope circuitry, and to adverse changes in raster size and focusing control.

What is claimed is:

1. In a television receiver employing a kinescope in which beam current flows as a function of the setting of a brightness control coupled to vary a bias voltage on an electrode thereof and having a plurality of electrodes operated from a high voltage supply which generates suitable operating potentials by the rectification of pulses obtained from appropriate deflection circuits within said receiver, apparatus for limiting the beam current flowing in said kinescope to a desired, predetermined level comprising:

a transistor having emitter, base and collector electrodes;

a source of operating potential;

means including said brightness control coupling the collector electrode of said transistor to said operating potential source;

means coupling the emitter electrode of said transistor to a point of reference potential;

a source of substantially constant current; and means coupling said substantially constant current source to said high voltage supply and to the base electrode of said transistor dividing its supplied constant current into a first portion providing the beam current for said kinescope and into a second portion providing a bias current for said transistor of a magnitude to cause said transistor to saturate, said last-mentioned means providing said bias current portion until the beam current flowing in said kinescope is increased to said predetermined value, beyond which increases in said beam current decrease said bias current portion bringing said transistor out of saturation and changing its collector electrode potential to vary the bias voltage coupled by said brightness control to said kinescope in an offsetting manner, whereby said kinescope beam current is stabilized at said desired value.

2. The apparatus of claim 1 wherein said source of substantially constant current includes a source of substantially constant voltage coupled by a first resistance to said high voltage supply and to the base electrode of said transistor.

3. The apparatus of claim 2 wherein said source of operating potential for said transistor comprises said source of substantially constant voltage.

4. The apparatus of claim 3 wherein said means coupling the collector electrode of said transistor to said operating potential source includes second and third resistances respectively coupling opposite ends of said brightness control to said transistor and to said potential source, with said second and third resistances serving to limit the range of available bias voltage developed by said brightness control as a function of transistor conductivity.

5. The apparatus of claim 4 wherein said supplied current dividing means connects said source of substantially constant current directly to the base electrode of said transistor and wherein there is also included fourth and fifth resistances serially connected to couple said current source to said high voltage supply.

6. The apparatus of claim 5 wherein a first capacitance is included to couple the junction of said fourth and fifth resistances to said point of reference potential and wherein a second capacitance is also included to couple the junction of said fifth resistance with said high voltage supply to said reference potential point, said first and second capacitances cooperating with said fourth and fifth resistances to provide a pair of filter networks operative to reduce undesired horizontal and vertical scanning rate modulation of said kinescope beam current.

7. The apparatus of claim 6 wherein a third capacitance and sixth resistance are further coupled in series between the base and collector electrodes of said transistor to reduce the alternating current gain provided by said transistor and compensatingly reduce signal phase shifts introduced by said filter networks which tend to limit said beam current flow.

8. The apparatus of claim 7 wherein said fourth and fifth resistances comprise a pair of resistors of dissimilar power handling capabilities such that surges of voltage from said high voltage supply have a greater tendency to open-circuit the one of said pair of resistors closer to said high voltage supply prior to any open-circuiting of the other of said pair of resistors closer to said source of substantially constant current.

9. The apparatus of claim 1 for use in a television receiver of the type employing a high voltage supply including a voltage multiplying circuit responsive to pulses supplied from a winding on the horizontal output transformer of said receiver, and wherein said last-mentioned means is coupled to a point in said multiplier circuit at which a direct current is available as being representative of the beam current flow in said kinescope.

10. The apparatus of claim 1 for use in a television receiver of the type employing a high voltage supply including a voltage quadrupler circuit responsive to flyback pulses supplied from a secondary winding on the horizontal output transformer of said receiver, and wherein said last-mentioned means is coupled to a point in said voltage quadrupler at which a direct current is available for conducting current in response to, and directly proportional to, the beam current flowing in said kinescope.

11. The apparatus of claim 1 wherein said last-mentioned means provide said bias current portion until the beam current flowing in said kinescope is increased to said predetermined value by advancement of said brightness control, beyond which advances in said brightness control setting to increase said beam current decrease said bias current portion bringing said transistor out of saturation and changing its collector electrode potential to vary the bias voltage coupled by said brightness control to said kinescope in an offsetting manner.

* * * * *